United States Patent
Imamura et al.

(10) Patent No.: US 6,945,612 B2
(45) Date of Patent: Sep. 20, 2005

(54) SYSTEM FOR ESTIMATING BRAKE-FLUID PRESSURE

(75) Inventors: Masamichi Imamura, Kanagawa (JP); Motohiro Higuma, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/320,390

(22) Filed: Dec. 17, 2002

(65) Prior Publication Data

US 2003/0111896 A1 Jun. 19, 2003

(30) Foreign Application Priority Data

Dec. 18, 2001 (JP) .......................................... 2001-384516

(51) Int. Cl.$^7$ ................................................. B60T 8/00

(52) U.S. Cl. ...................... 303/167; 303/156; 303/155; 303/174

(58) Field of Search .................................. 303/156, 155, 303/167–174

(56) References Cited

U.S. PATENT DOCUMENTS

| | | | | | |
|---|---|---|---|---|---|
| 4,749,239 A | * | 6/1988 | Onogi et al. | ................. | 303/167 |
| 5,551,770 A | * | 9/1996 | Hrovat et al. | ................ | 303/167 |

* cited by examiner

*Primary Examiner*—Matthew C. Graham
(74) *Attorney, Agent, or Firm*—Foley & Lardner LLP

(57) ABSTRACT

A brake control system includes a brake line with a supply line, a pump for supplying brake fluid to the supply line, branch lines branched from the supply line to wheel cylinders, a pressure controller for allowing independent control of brake-fluid pressures within the wheel cylinders, and an ECU for controlling the pump and the pressure controller. The ECU includes an estimate part for estimating the pressures within the wheel cylinders in accordance with a flow amount of brake fluid obtained out of signals indicative of braking conditions, wherein it is estimated an amount of brake fluid flowing from the supply line to the wheel cylinder during execution of brake-fluid pressure control of the ECU and when the control is switched to pressure-increase control for the wheel cylinder having the pressure lower than that in the supply line, and wherein it is estimated the pressure within the wheel cylinder in accordance with the amount of brake fluid as estimated.

17 Claims, 7 Drawing Sheets

FIG.7B EMBODIMENT

SYSTEM FOR ESTIMATING BRAKE-FLUID PRESSURE

BACKGROUND OF THE INVENTION

The present invention relates generally to a brake control system, and more particularly, to a system for estimating the brake-fluid pressure.

In recent years, vehicle-mounted braking devices have various functions added. Such braking devices are known, for example, in the form of an antiskid braking system for achieving shortening of the braking distance while maintaining the vehicle behavior stable by preventing wheel lock, a traction control system for preventing spin of driving wheels during vehicle acceleration and the like, a brake assist device constructed so that when the brake-fluid pressure operated by a driver is insufficient, this insufficiency of brake-fluid pressure is supplied to a wheel cylinder, and a vehicle-stability control system for securing the running stability of the vehicle by providing a braking force to the wheels regardless of presence of brake operation by a driver so as to remove oversteer or understeer of the vehicle.

With the above braking devices, accurate grasp of the fluid pressure within the wheel cylinder and that produced by operation of a brake pedal will allow more precise control of a driving time or the like of a control valve for controlling the fluid pressure, leading to further enhanced control accuracy of the braking devices. One approach is to provide a fluid-pressure sensor to a master cylinder or a wheel cylinder so as to measure the fluid pressure within the master cylinder or the wheel cylinder. However, this approach involves an increase in manufacturing cost of the device.

Due to such problem of manufacturing cost, another approach is proposed wherein only the fluid pressure within the master cylinder is measured by the fluid-pressure sensor, and calculation is made as to how this pressure varies in accordance with a fluid-pressure model of the braking device to estimate the fluid pressure within the wheel cylinder. Specifically, a variation in the fluid pressure calculated in accordance with a drive signal for the braking device is added to an estimated fluid pressure (previous value) within the wheel cylinder obtained using the fluid pressure within the master cylinder, thus estimating a current value of the fluid pressure within the wheel cylinder.

However, as will be described later, the latter approach raises a problem that an estimated fluid pressure within the wheel cylinder exceeds an actual fluid pressure.

SUMMARY OF THE INVENTION

It is, therefore, an object of the present invention to provide a system for estimating the brake-fluid pressure, which contributes to an enhancement in estimation accuracy of the brake-fluid pressure within the wheel cylinder.

The present invention provides generally a brake control system for a motor vehicle with a master cylinder and wheel cylinders, which comprises: a brake line with a supply line; a pump which supplies brake fluid to the supply line; branch lines branched from the supply line to the wheel cylinders; a pressure controller which allows independent control of brake-fluid pressures within the wheel cylinders; and an ECU which controls the pump and the pressure controller, the ECU comprising an estimate part which estimates the pressures within the wheel cylinders in accordance with a flow amount of brake fluid obtained out of signals indicative of braking conditions, the estimate part being so constructed as to: estimate an amount of brake fluid flowing from the supply line to the wheel cylinder during execution of brake-fluid pressure control of the ECU and when the control is switched to pressure-increase control for the wheel cylinder having the pressure lower than that in the supply line; and estimate the pressure within the wheel cylinder in accordance with the amount of brake fluid as estimated.

BRIEF DESCRTIPTION OF THE DRAWINGS

The other objects and features of the present invention become apparent from the following description with reference to the accompanying drawings, wherein.

DETAILED DESCRIPTION OF THE INVENTION

Figure 1:
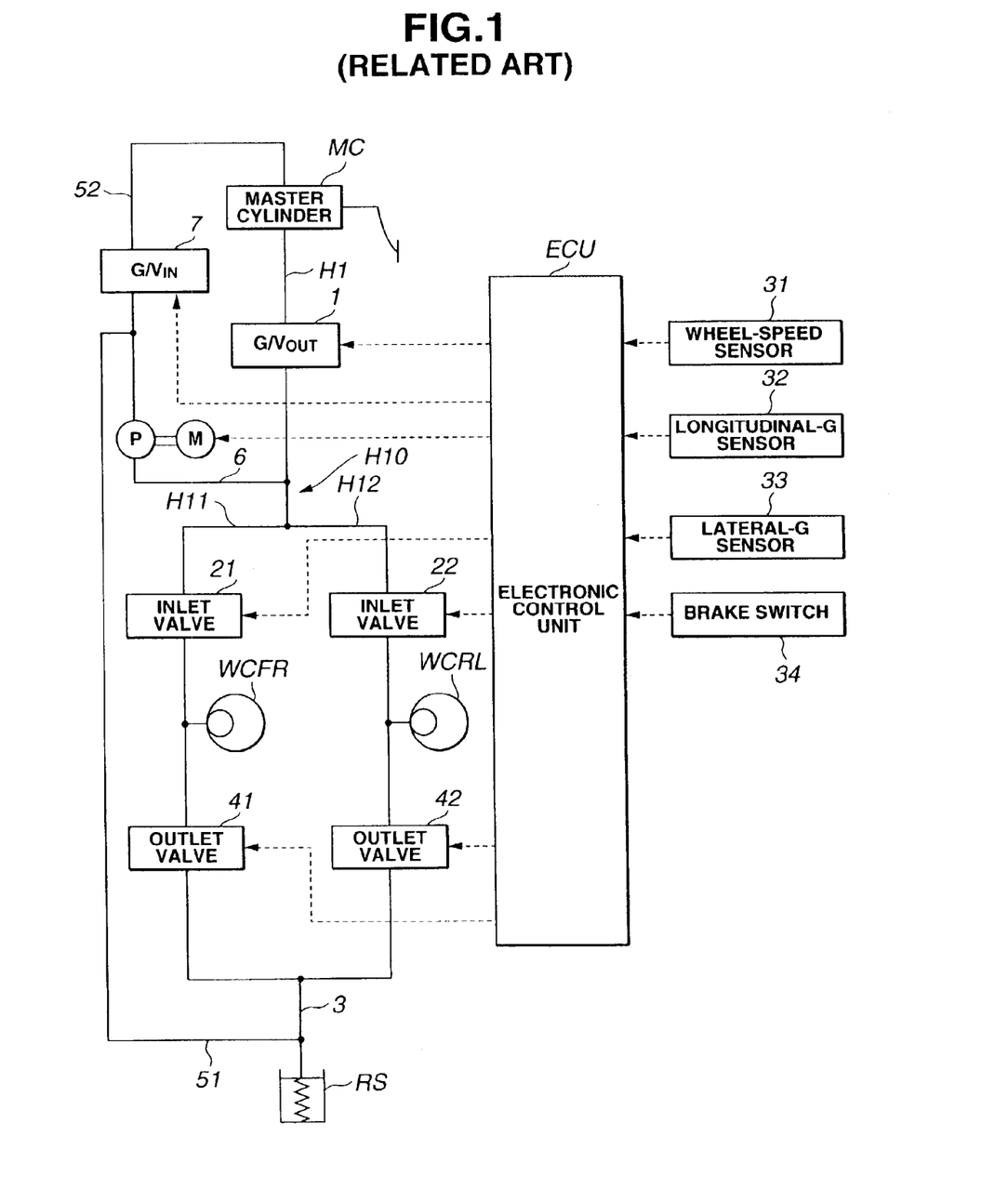
FIG. 1 is a block diagram showing a brake control system to which a system for estimating the brake-fluid pressure according to the present invention is applied.

Referring to FIG. 1, before entering a description about a system for estimating the brake-fluid pressure embodying the present invention, a related-art brake control system is described which can actively provide a braking force to wheels. Referring to FIG. 1, a brake line H1 is one of two systems of an X-type brake line. The X-type brake line is a line arrangement in which the lines for supplying brake fluid to the wheel cylinders of four wheels are divided into two systems, the lines of each system being connected to one of the front wheels and one of the rear wheels in such a way that one of the front wheel is a left wheel, and one of the rear wheels is a right wheel.

Brake line H1 is connected to wheel cylinders WCFR, WCRL of front-right wheel FR and rear-left wheel RL. A normally open OUT-side gate valve 1 and normally open inlet valves 21, 22, which are open under non-energization, are arranged between a master cylinder MC and wheel cylinders WCFR, WCRL. Normally-closed outlet valves 41, 42, which are closed usually and open under energization, are arranged in a drain circuit 3 connecting brake line H1 and a reservoir RS.

Reservoir RS and master cylinder MC are connected to the suction side of a pump P through suction circuits 51, 52, respectively. A discharge circuit 6 arranged on the discharge side of pump P is connected to a supply line H10 in brake line H1 and between OUT-side gate valve 1 and inlet valves 21, 22. A normally closed IN-side gate valve 7 is arranged in suction circuit 52.

Thus, when starting braking control for increasing the fluid pressure for front-right wheel FR, control is carried out to close OUT-side gate valve 1, open IN-side gage valve 7, and drive pump P. In this state, OUT-side gate valve 1 is opened appropriately to control the fluid pressure between OUT-side gate valve 1 and inlet valves 21, 22 at a desired value. Moreover, control is carried out to close inlet valve 22 and open appropriately inlet valve 21, supplying a desired fluid pressure to wheel cylinder WCFR of front-right wheel FR, thus generating a desired braking force.

As for estimation of the fluid pressure at this time, the discharge amount of pump P is calculated, and the flow amount discharged from OUT-side gate valve 1 to master cylinder MC is calculated. Moreover, the flow amount flowing into wheel cylinder WCFR through inlet valve 21 is calculated, thus estimating the pressure between OUT-side gate valve 1 and inlet valves 21, 22 and that within wheel cylinder WCFR.

However, as is described before, the above brake control system raises the following problem to be solved. When switching from controlling the fluid pressure within one wheel cylinder (in the above case, the pressure within front-right wheel cylinder WCFR is increased) to controlling the fluid pressure for front-right wheel FR in the decreasing direction and that for rear-left wheel RL in the increasing direction, braking control is carried out to continue drive of OUT-side gate valve 1, IN-side gate valve 7, and pump P, and to put inlet valve 21 closed and inlet valve 22 open.

However, the pressure in supply line H10 upstream of inlet valve 22 is in the sufficiently increased state by previous pressure-increase control for front-right wheel FR, so that at the time of opening inlet valve 22 in such a way, a phenomenon occurs that brake fluid in the upstream line of inlet valve 22 flows into wheel cylinder WCFL of rear-left wheel RL through inlet valve 22.

Figure 7A:
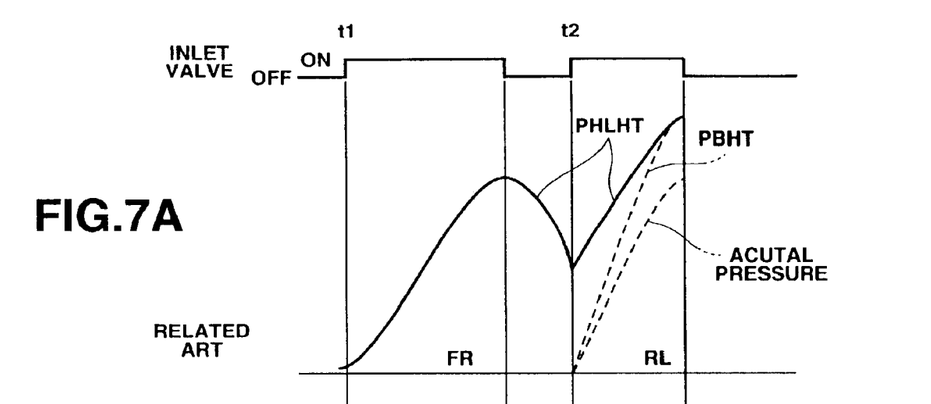
FIGS. 7A–7B are time charts showing examples of operation of braking control.
Figure 7B:
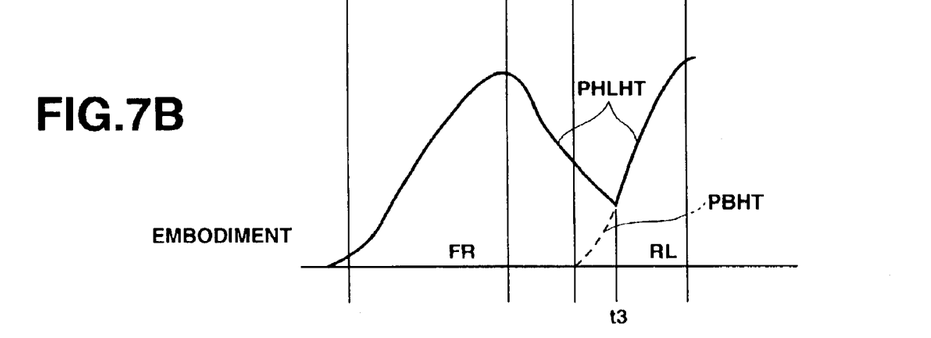

As a consequence, referring to FIG. 7, the fluid pressure within the wheel cylinder simply obtained by the pressure in the upstream line of inlet valve 22 and a drive pulse for inlet valve 22 are calculated without consideration of a pressure drop in the upstream line of inlet valve 22 produced by the above inflow, raising a problem that an estimated fluid pressure within the wheel cylinder exceeds an actual fluid pressure.

Referring now to the drawings, particularly, FIGS. 2–7, an embodiment of a system for estimating the brake-fluid pressure is described. Since this embodiment is applied to the brake control system described with reference to FIG. 1, the structure of the brake control system is explained briefly.

Brake line H1 includes branch lines H11, H12 arranged closer to wheel cylinders WCFR, WCRL than OUT-side gate valve 1 (refer hereafter to as downstream side) and branched to respective wheel cylinders WCFR, WCRL. Supply line H10 is arranged in brake line H1 and between OUT-side gate valve 1 and inlet valves 21, 22 to receive brake fluid discharged from pump P.

Thus, control is carried out to close OUT-side gate valve 1, open IN-side gage valve 7, and drive pump P. In this state, OUT-side gate valve 1 is opened appropriately, allowing the fluid pressure between OUT-side gate valve 1 and inlet valves 21, 22 to be controlled at a desired value. Moreover, control is carried out to open inlet valves 21, 22 appropriately, supplying a desired fluid pressure to each wheel cylinder WCFR, WCRL, thus allowing generation of a desired braking force. Further, outlet valves 41, 42 are opened appropriately to discharge the fluid pressures within wheel cylinders WCFR, WCRL to reservoir RS, allowing achievement of a desired pressure decrease.

Actuation of pump P and valves 1, 21, 22, 41, 42, 7 is carried out by an electronic control unit ECU. For controlling the fluid pressures within wheel cylinders WCFR, WCRL, ECU carries out estimation of those fluid pressures. A part for carrying out fluid-pressure estimation corresponds to a system for estimating the brake-fluid pressure according to the present invention.

Figure 2:
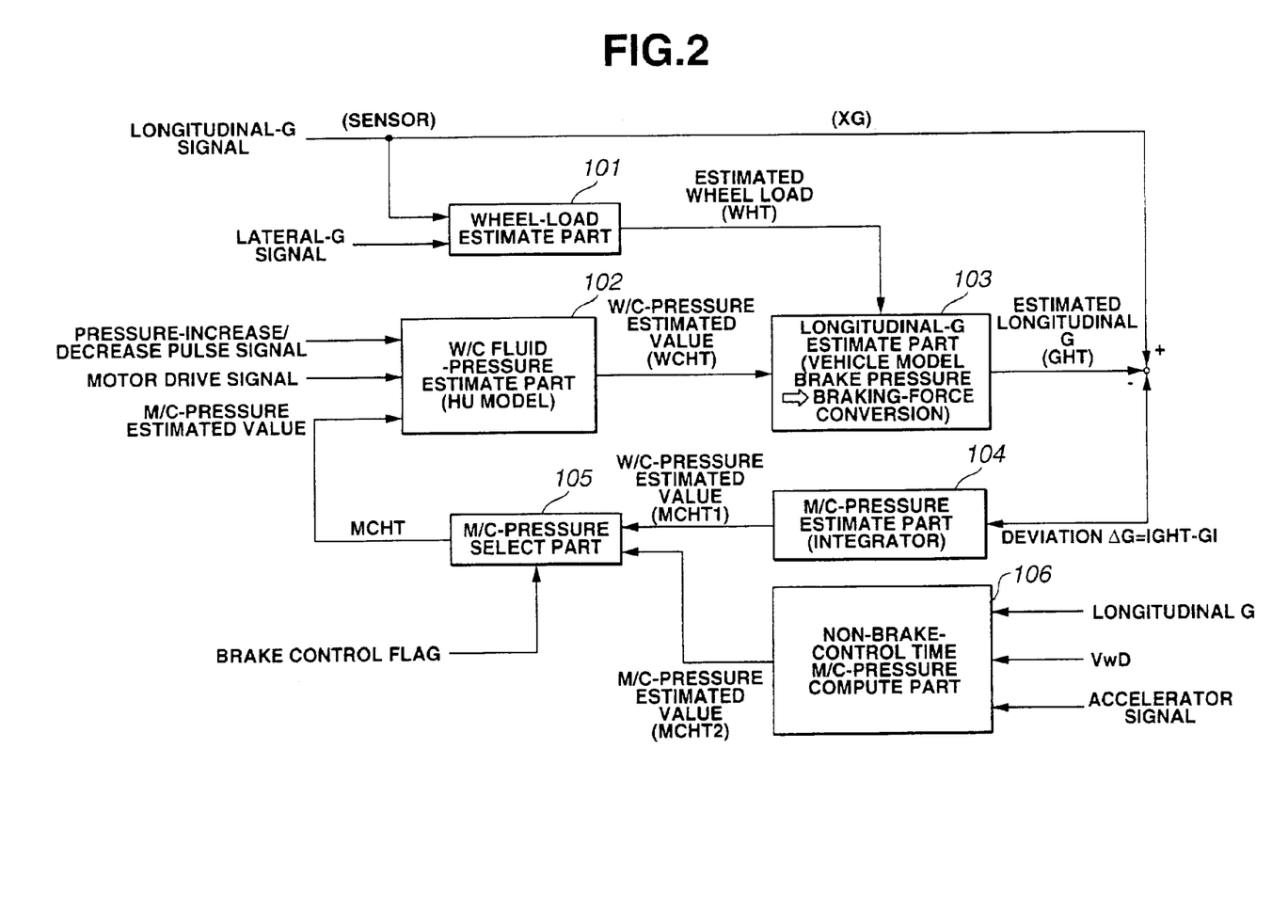
FIG. 2 is a view similar to FIG. 1, showing a brake-fluid pressure estimate part.

Referring to FIG. 2, input to the brake-fluid pressure estimate part are signals out of a wheel-speed sensor 31 for sensing accelerations of the wheels, a longitudinal-acceleration sensor (refer hereafter to as longitudinal-G sensor) 32 for sensing a longitudinal acceleration XG of the vehicle, and a lateral-acceleration sensor (refer hereafter as lateral-G sensor) 33 for sensing a lateral acceleration YG of the vehicle, pressure-increase/decrease pulse signals to be output to OUT-side gate valve 1, inlet valves 21, 22, and outlet valves 41, 42, and an accelerator signal ACC indicative of the accelerator opening to be input from an engine control unit, not shown.

The structure of the brake-fluid pressure estimate part is described. A wheel-load estimate part 101 serves to estimate a vehicle weight acting on the wheel, i.e. a wheel load, in accordance with longitudinal acceleration XG sensed by longitudinal-G sensor 32 and lateral acceleration YG sensed by lateral-G sensor 33. The wheel load can be estimated in accordance with a vehicle model, wherein the correlation between predetermined longitudinal acceleration XG and lateral acceleration YG and a load acting on the wheel is experimentally obtained in advance, which is stored as an estimated wheel load WHT in a table and the like.

A W/C fluid-pressure estimate part 102 serves to determine a W/C-pressure estimated value WCHT or estimated fluid pressure within the wheel cylinder out of pressure-increase/decrease pulse signals or drive signals for the valves and motor M, a motor drive signal, and an M/C-pressure estimated value MCHT as will be described later and in accordance with a braking-device model obtained in advance by experiment, simulation or the like.

A longitudinal-G estimate part 103, which includes a vehicle model obtained in advance by experiment, simulation or the like, serves to estimate a longitudinal acceleration generated in the vehicle or estimated longitudinal acceleration GHT with respect to the vehicle model by using W/C-pressure estimated value WCHT and estimated wheel load WHT.

A M/C-pressure estimate part 104 serves to correct an M/C-pressure estimated value MCHT1, since when a deviation $\Delta G$ occurs between estimated longitudinal acceleration GHT and actual longitudinal acceleration XG sensed by longitudinal-G sensor 32, it is recognized that M/C-pressure estimated value MCHT or W/C-pressure estimated value WCHT has an error. Specifically, deviation $\Delta G$ between estimated longitudinal acceleration GHT and actual longitudinal acceleration XG is integrated to convert an acceleration into a braking force (=K×∫$\Delta G$dt, where K is a coefficient). And with an M/C-pressure estimated value MCHT2 estimated at the time of non brake control by a non-brake-control time M/C-pressure compute part 106 as will be described later, i.e. an initial value of M/C-pressure estimated value MCHT at the time of brake control, the fluid pressure within master cylinder MC at the time of brake control is newly estimated. This estimated fluid pressure is used as more accurate M/C-pressure estimated value MCHT1 with an error corrected.

An M/C-pressure select part 105 serves to select one of two M/C-pressure estimated values MCHT1, MCHT2 derived in parallel from M/C-pressure estimate part 104 and non-brake-control time M/C-pressure compute part 106 by determining whether it is involved in brake-control time or non-brake-control time in accordance with a brake-control flag input to M/C-pressure select part 105.

Non-brake-control time M/C-pressure compute part 106 serves to estimate M/C-pressure estimated value MCHT2 or fluid pressure within master cylinder MC in accordance with longitudinal acceleration XG, a wheel acceleration VWD, and an accelerator signal. Specifically, the relationship between the fluid pressure provided to the wheel cylinder and longitudinal acceleration XG to be generated accordingly can be seen by experiment or the like. And the use of wheel acceleration VWD allows an influence of road-surface friction and the like for the vehicle to be reflected on estimation of the fluid pressure. In this embodiment, longitudinal acceleration XG is sensed by longitudinal-G sensor 32. Optionally, longitudinal acceleration XG may be calculated in accordance with a wheel speed VW and a variation therein. In this alternative, longitudinal acceleration XG can be determined accurately without being influenced by a road-surface gradient.

Therefore, in the brake-fluid pressure estimate part as shown in FIG. 2, when brake control is not carried out such as vehicle-stability control by the brake, but brake operation is carried out (which can be determined in accordance with a signal out of a brake switch 34 or the like provided to a brake pedal, not shown), non-brake-control time M/C-pressure compute part 106 computes M/C-pressure estimated value MCHT2 in accordance with signal of longitudinal acceleration XG sensed by longitudinal-G sensor 32 and vehicle speed VW sensed by wheel-speed sensor 31, and accelerator signal ACC.

M/C-pressure estimated value MCHT2 computed in non-brake-control time M/C-pressure compute part 106 is provided to M/C-pressure select part 105 in which one of two M/C-pressure estimated values MCHT1, MCHT2 is selected as M/C-pressure estimated value MCHT. When both brake control and brake operation are not carried out, or the accelerator pedal is not depressed, the fulfillment of zero-point correction of longitudinal-G sensor 22 allows more accurate estimation of the fluid pressure within master cylinder MC. When brake operation is not carried out, an estimated fluid pressure within master cylinder MC is set to zero.

When brake control is carried out, first, M/C-pressure select part 105 selects M/C-pressure estimated value MCHT2 obtained in non-brake-control time M/C-pressure compute part 106 as an initial value of M/C-pressure estimated value MCHT, which is provided to W/C fluid-pressure estimate part 102. Then, W/C fluid-pressure estimate part 102 estimates W/C-pressure estimated value WCHT in accordance with the braking-device model having as input M/C-pressure estimated value MCHT and drive signals of the valves and motor M. Then, longitudinal-G estimate part 103 estimates a current longitudinal acceleration generated in the vehicle as estimated longitudinal acceleration GHT in accordance with the vehicle model having as input W/C-pressure estimated value WCHT and estimated wheel load WHT estimated in wheel-load estimate part 101.

Estimated longitudinal acceleration GHT estimated in such a way is compared with actual longitudinal acceleration XG sensed by longitudinal-G sensor 32 to verify accuracy of estimated longitudinal acceleration GHT. The verification of estimated longitudinal acceleration GHT is equivalent to that of W/C-pressure estimated value WCHT or M/C-pressure estimated value MCHT, so that when no deviation ΔG exists between estimated longitudinal acceleration GHT and actual longitudinal acceleration XG, it can be considered that W/C-pressure estimated value WCHT or M/C-pressure estimated value MCHT is a correct value that reflects actual occurrence.

On the other hand, when deviation ΔG exits between estimated longitudinal acceleration GHT and actual longitudinal acceleration XG, it is recognized that M/C-pressure estimated value MCHT or W/C-pressure estimated value WCHT has an error. Thus, M/C-pressure estimated part 104 corrects M/C-pressure estimated value MCHT1. Corrected M/C-pressure estimated value MCHT1 is provided to M/C-pressure select part 105 in which it is selected as M/C-pressure estimated value MCHT, then the above estimation is repeatedly carried out.

Figure 3:
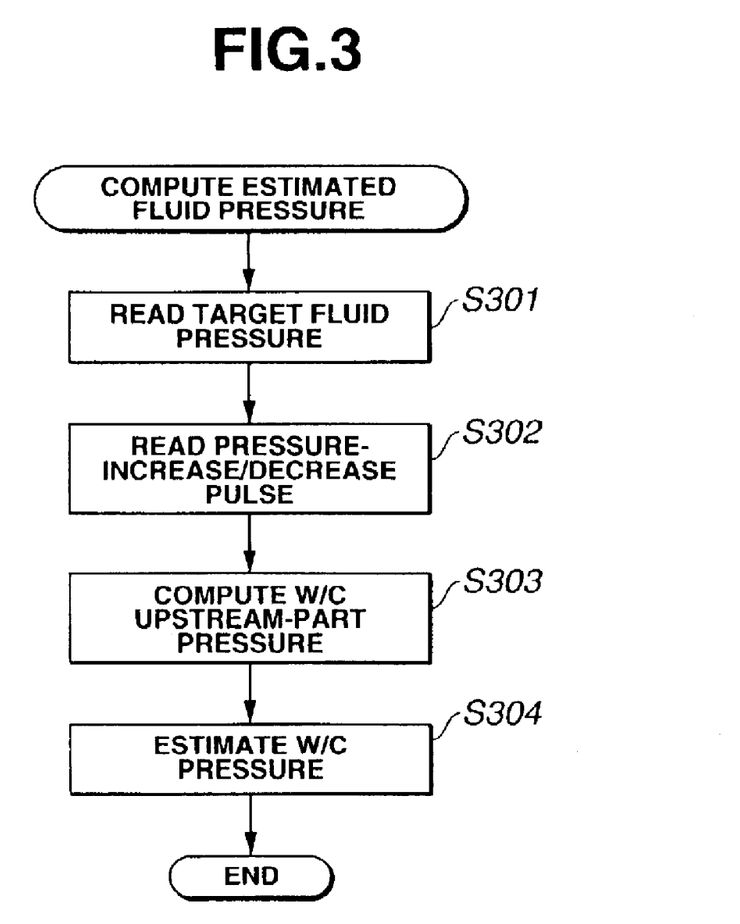
FIG. 3 is a flowchart showing operation of the embodiment.

The determination of W/C-pressure estimated value WCHT in W/C-pressure estimate part 102 is carried out using the system for estimating the brake-fluid pressure according to the present invention. Referring to FIG. 3, there is shown a processing flow up to determination of W/C-pressure estimated value WCHT executed by the system.

Referring to FIG. 3, at a step S301, processing is carried out to read a target fluid pressure. The target fluid pressure is determined as target W/C pressure for obtaining a required braking force, for example, in a part for carrying out braking-force control such as vehicle-stability control. At step S301, the target fluid pressure is read from the part for carrying out braking-force control.

At a step S302, processing is carried out to read a pressure-increase/decrease pulse. The pressure-increase/decrease pulse is a drive pulse for controlling drive of OUT-side gate valve 1, inlet valves 21, 22, outlet valves 41, 42, and motor M required for obtaining the target fluid pressure.

At a step S303, processing is carried out to compute a W/C upstream-part pressure PHLHT. W/C upstream-part pressure PHLHT is a pressure within supply line H10 between OUT-side gate valve 1 and inlet valves 21, 22, the detail of which will be described later.

At a step S304, processing is carried out to estimate the W/C pressure. This processing is to obtain W/C estimated value WCHT, the detail of which will be described later.

Figure 4:
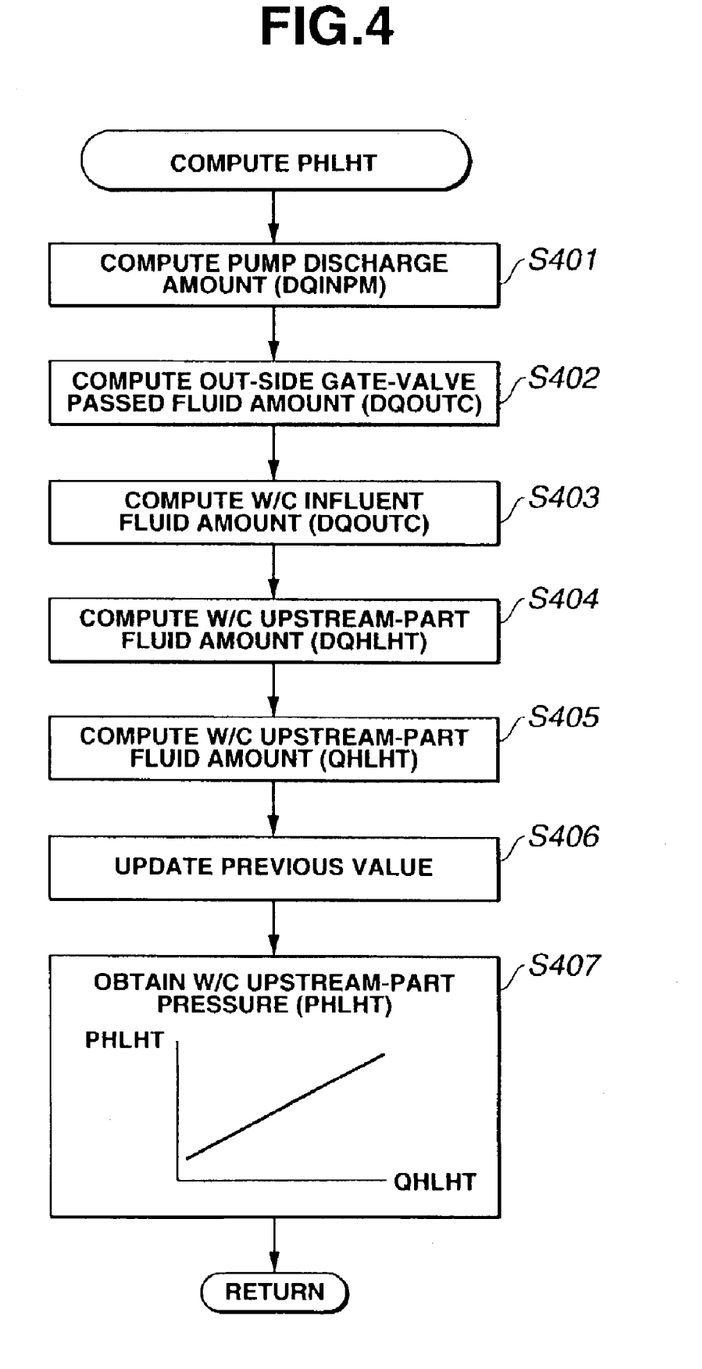
FIG. 4 is a chart similar to FIG. 3, showing operation of the embodiment.

Referring to FIG. 4, a detailed description is made about processing for computing W/C upstream-part pressure PHLHT at step S303. At a step S401, it is computed a pump discharge amount DQINPM or amount of brake fluid discharged from pump P. Pump discharge amount DQINPM can be determined by multiplying the pump discharge amount obtained from an energization time of motor M by an open time of IN-side gate valve 7.

At step S402, it is computed an OUT-side gate-valve passed fluid amount DQOUTG or fluid amount discharged from supply line H10 to master cylinder MC through OUT-side gate valve 1. OUT-side gate-valve passed fluid amount DQOUTG can be obtained in accordance with the following arithmetic expression:

$$DQOUTG = (PHLHT - MCHT)^{1/2} \times \text{gain} \times T\text{out}$$

wherein gain is a coefficient, and Tout is an open time of OUT-side gate valve 1. Note that PHLHT is W/C upstream-part pressure, and MCHT is M/C-pressure estimated value.

At a step S403, it is computed an influent fluid amount DQOUTC from supply line H10 to the wheel cylinder targeted for pressure-increase control, the detail of which will be described later.

At a step S404, it is computed a W/C upstream-part varied fluid amount DQHLHT or variation in brake fluid held in supply line H10 (W/C upstream part) between OUT-side gate valve 1 and inlet valves 21, 22 in accordance with the following expression:

$$DQHLHT = DQINPM - DQOUTG - DQOUTC$$

Note that the values DQHLHT, DQINPM, DQOUTG, and DQOUTC are variations per unit time.

At a step S405, it is computed a W/C upstream-part fluid amount QHLHT or amount of brake fluid held in supply line H10 (W/C upstream part) in accordance with the following expression:

$$QHLHT = QHLHT\_z1 + DQHLHT$$

Note that QHLHT_z1 is a previous value of W/C upstream-part fluid amount QHLHT. At a subsequent step S406, previous value QHLHT_z1 is updated to a current value.

At a step S407, W/C upstream-part pressure PHLHT is obtained from W/C upstream-part fluid amount QHLHT with reference to lookup of a preset conversion table or in accordance with calculation using a preset arithmetic expression.

Figure 5:
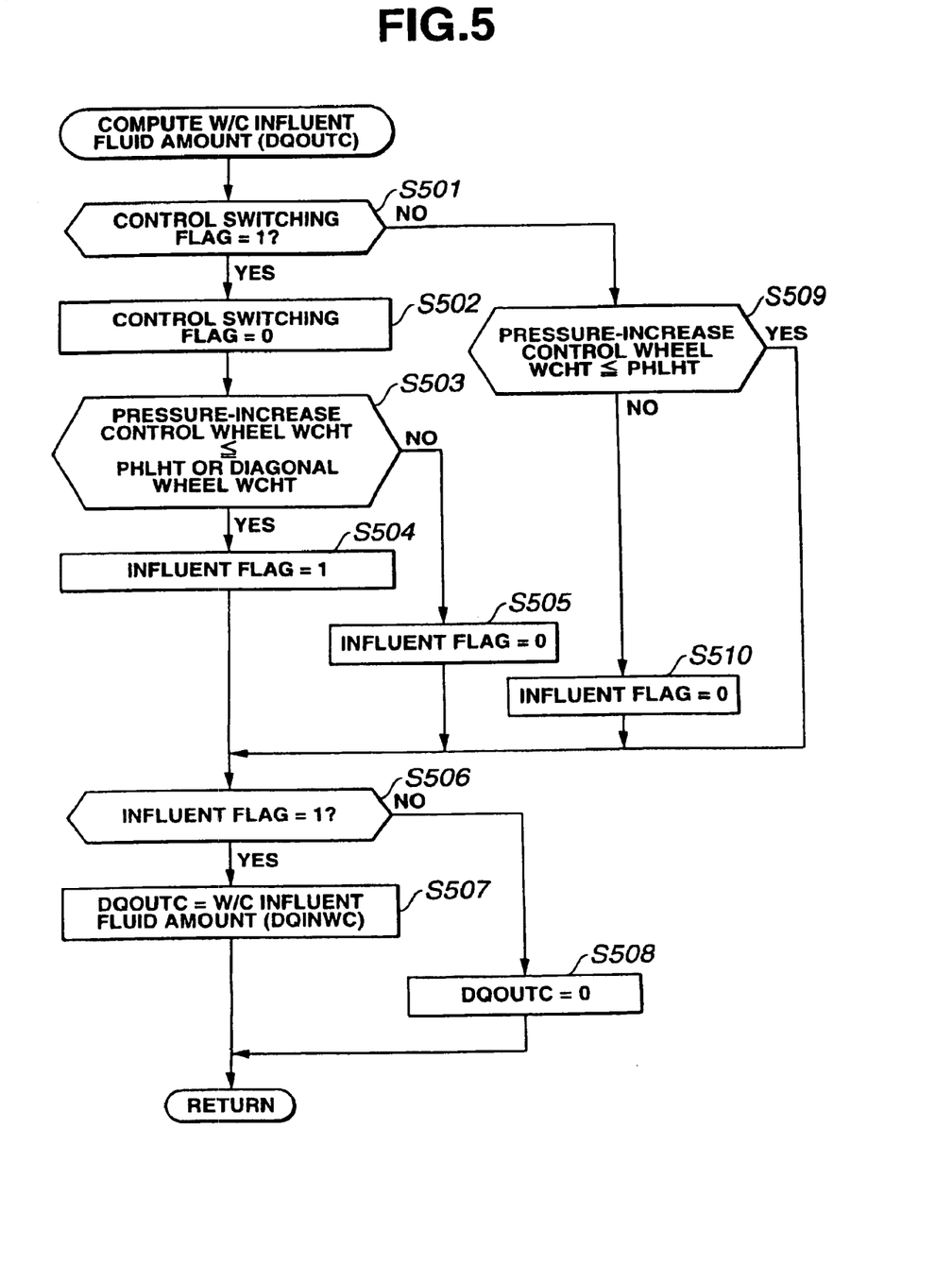
FIG. 5 is a chart similar to FIG. 4, showing operation of the embodiment.

Referring to FIG. 5, a detailed description is made about processing for computing influent fluid amount DQOUTC at step S403. At a step S501, it is determined whether or not a control switching flag is equal to 1. If it is determined that the control switching flag is equal to 1, flow proceeds to a step S502. In contrast, if it is determined that the flag is not equal to 1, flow proceeds to a step S509.

Ordinarily, the control switching flag is set to zero. In brake-fluid pressure control, when carrying out pressure-increase control of the wheel cylinder which is not subjected to pressure-increase control so far and that W/C-pressure estimated value WCHT or pressure within the wheel cylinder targeted for this control is lower than W/C upstream-part pressure PHLHT or pressure in supply line H10, the control switching flag is set to 1. There are two cases of switching control: The first case is to carry out switching from control of increasing the pressure for one of front-right wheel RF and rear-left wheel RL and retaining the pressure for another wheel, i.e. close inlet and outlet valves 21, 22, 41, 42, to control of decreasing the pressure for one of front-right wheel RF and rear-left wheel RL which is subjected to pressure-increase control so far and increasing the pressure for another wheel which is subjected to pressure-retention control so far. The second case is to carry out switching from control of retaining the pressures for front-right wheel RF and rear-left wheel RL to control of increasing the pressure for one wheel and decreasing the pressure for another wheel.

At a step S502, the control switching flag is reset to zero. Specifically, the control switching flag is set to 1 only during a period from determination at step S501 to processing at step S502 after execution of the above switching control.

At a step S503, it is determined whether or not W/C-pressure estimated value WCHT or pressure within the wheel cylinder targeted for pressure-increase control resulting from switching control is equal to or lower than W/C upstream-part pressure PHLHT or pressure in supply line H10. In the above first case, it can be determined whether or not W/C-pressure estimated value WCHT or pressure within the wheel cylinder targeted for pressure-increase control is equal to or lower than W/C-pressure estimated value WCHT of another wheel cylinder. At step S503, if it is determined that the answer is YES, flow proceeds to a step S504 where an influent flag is set to 1. In contrast, if it is determined that the answer is NO, flow proceeds to a step S505 where the influent flag is set to zero.

At a step S506, it is determined whether or not the influent flag is equal to 1. If it is determined that the influent flag is equal to 1, flow proceeds to a step S507. In contrast, if it is determined that the influent flag is not equal to 1, flow proceeds to a step S508. At step S507, an inlet-valve passed fluid amount DQINWC is set to W/C influent fluid amount DQOUTC. The manner of determination of inlet-valve passed fluid amount DQINWC will be described later. At step S508, W/C influent fluid amount DQOUTC is set to zero.

At a step S509, it is determined whether or not W/C-pressure estimated value WCHT or pressure within the wheel cylinder for the pressure-increase control wheel is equal to or lower than W/C upstream-part pressure PHLHT or pressure in supply line H10. If it is determined that W/C-pressure estimated value WCHT≦W/C upstream-part pressure PHLHT, flow proceeds to step S506 directly, whereas if it is determined that WCHT>PHLHT, flow proceeds to a step S510 where the influent flag is reset to zero. Specifically, the influent flag is switched to 1 until when the pressure within the wheel cylinder targeted for pressure-increase control is equal to or lower than W/C upstream-part pressure PHLHT or pressure within the wheel cylinder which is subjected to pressure-increase control so far, it reaches W/C upstream-part pressure PHLHT.

Figure 6:
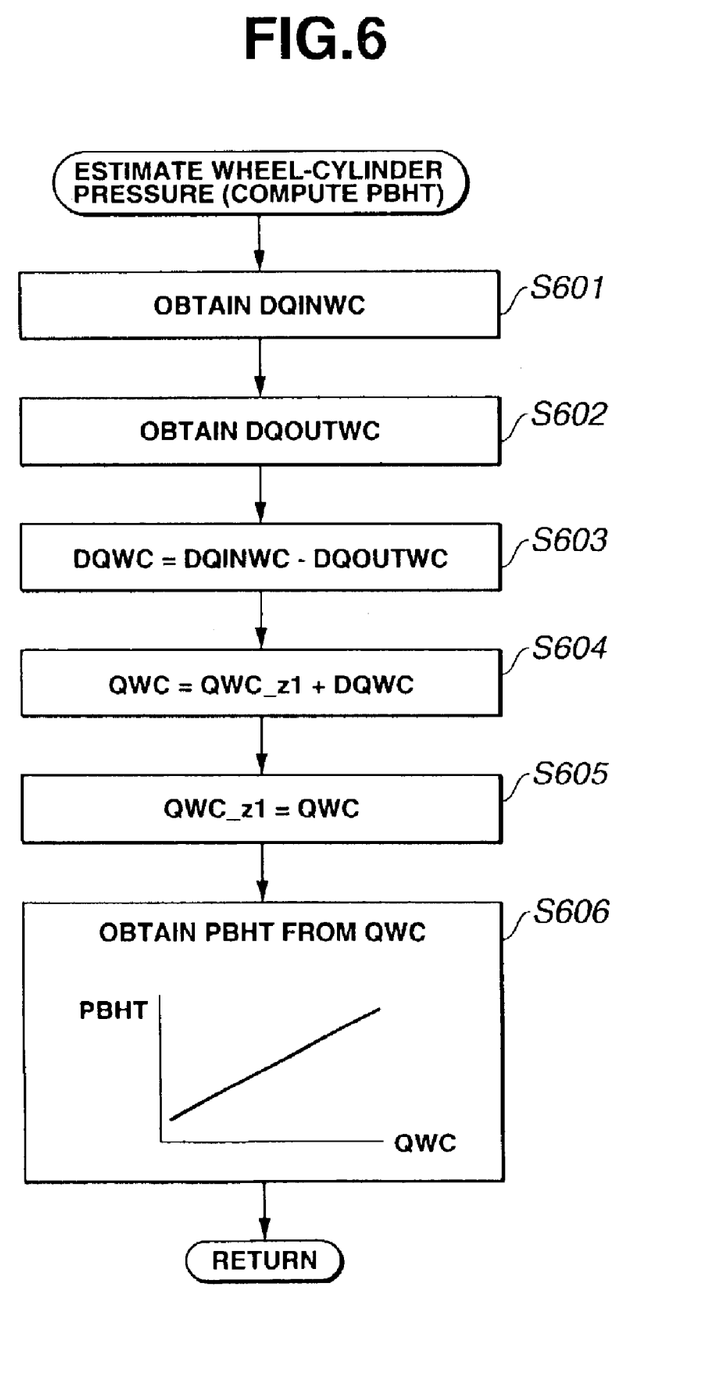
FIG. 6 is a chart similar to FIG. 5, showing operation of the embodiment.

Referring to FIG. 6, a detailed description is made about processing of estimating the wheel-cylinder pressure at step S304. At a step S601, inlet-valve passed fluid amount DQINWC or fluid amount per unit time supplied through inlet valve 21 or 22 from supply line H10 to the wheel cylinder targeted for pressure increase control is obtained in accordance with the following expression:

$$DQINWC = (PHLHT - PBHT)^{1/2} \times gain \times TVIN$$

where TVIN is an open time of inlet valve 21, 22. Note that PHLTHT is W/C upstream-part pressure, and PBHT is W/C pressure which is equal to W/C-pressure estimated value WCHT.

At a step S602, an outlet-valve passed fluid amount DQOUTWC or fluid amount per unit time discharged though outlet valve 41 or 42 from wheel cylinder targeted for pressure-increase control to reservoir RS is obtained in accordance with the following expression:

$$DQOUTWC = (PBHT)^{1/2} \times gain \times TVOUT$$

where TVOUT is an open time of outlet valve 41, 42.

At a step S603, a variation per unit time DQWC in brake fluid in the wheel cylinder targeted for pressure-increase control is obtained in accordance with the following expression:

$$DQWC = DQINWC - DQOUTWC$$

At a step S604, variation DQWC is integrated in accordance with the following expression to obtain a W/C fluid amount QWC or fluid amount in the wheel cylinder targeted for pressure-increase control:

$$QWC = QWC\_z1 + DQWC$$

where QWC_z1 is a previous value of W/C fluid amount QWC. At a subsequent step S605, previous value QWC_z1 is updated to a current value.

At a step S606, W/C pressure PBHT is obtained from W/C fluid amount QWC with reference to lookup of a preset conversion table or in accordance with calculation using a preset arithmetic expression. W/C pressure PBHT is output as W/C-pressure estimated value WCHT.

Referring to FIGS. 7A–7B, examples of operation of braking control are described, wherein FIG. 7A shows a related art, and FIG. 7B shows illustrative embodiment, wherein solid lines indicate variations in W/C upstream-part pressure PHLHT or estimated pressure in supply line H10. As shown in FIGS. 7A–7B, at a point "t1", pressure-increase control is started for front-right wheel cylinder WCFR, whereas pressure-retention control with inlet valve 22 and outlet valve 42 closed is carried out for rear-left wheel cylinder WCRL. And at a point "t2", control for front-right wheel cylinder WCFR is finished to start a pressure decrease therein, whereas pressure-increase control is started for rear-left wheel cylinder WCRL.

In connection with fulfillment of this braking control, in the related art as shown in FIG. 7A, it is not considered W/C influent fluid amount DQOUTC flowing from supply line H10 into wheel cylinder WCRL by a fluid-pressure difference concurrently with opening of inlet valve 22 on the side of wheel cylinder WCRL by switching of control, leading to a rise in W/C upstream-part pressure PHLHT from control switching point "t2". Referring to FIG. 7A, broken lines indicate actual W/C pressure PBHT. During pressure-increase control, W/C upstream-part pressure PHLHT should be equal to W/C pressure PBHT per se, while W/C upstream-part pressure PHLHT is higher than W/C pressure PBHT actually, which shows that W/C upstream-part pressure PHLHT is estimated to be higher than the actual value.

On the other hand, in the illustrative embodiment as shown in FIG. 7B, due to consideration of W/C influent fluid amount DQOUTC at step S403 and processing at steps S404–S407 in accordance therewith, W/C upstream-part pressure PHLHT is calculated to be lower than that in the related art, i.e. with higher accuracy. Moreover, with the wheel cylinder WCRL subjected to pressure-increase control from point "t2", at step S601, inlet-valve passed fluid amount DQINWC is obtained in accordance with W/C upstream-part pressure PHLHT calculated with higher accuracy, in accordance with which W/C pressure PBHT is calculated. And while the wheel-cylinder pressure is lower than the pressure in supply line H10, which is determined at steps S503, S509, the influent flag is set to 1 to allow estimation considering the influent amount, so that W/C upstream-part pressure PHLHT is estimated to be lower after point "t2" as well. Then, at a point "t3", W/C upstream-part pressure PHLHT coincides with actual W/C pressure PBHT, the flow amounts passing through inlet valves 21, 22 rise together.

In contrast to the related art, in the illustrative embodiment, W/C upstream-part pressure PHLHT and W/C pressure PBHT are not estimated to be higher, resulting in greatly enhanced estimation accuracy. This allows fulfillment of accurate braking control. Moreover, in the illustrative embodiment, the estimation is carried out in accordance with the vehicle model or the braking-device model, requiring no sensors for sensing the pressures within wheel cylinder WC and master cylinder MC, resulting in reduced manufacturing cost of the device.

Having described the present invention with regard to the illustrative embodiment, it is noted that the present invention is not limited thereto, and various changes and modifications can be made without departing from the scope of the present invention.

By way of example, in the illustrative embodiment, the present invention is applied to an X-type brake line having two divided line systems. Optionally, the present invention can be applied to another type of brake line having two line systems divided longitudinally or laterally. Moreover, the present invention can be applied to still another type of brake line having four line systems branched to the wheel cylinders.

Further, in the illustrative embodiment, the estimated influent amount per unit time is obtained in accordance with a fluid-pressure difference between supply line H10 and wheel cylinder WC, which allows estimation of the accurate influent amount. Alternatively, the estimation may be carried out simply in accordance with the fluid pressure in supply line H10 only or the target fluid pressure.

Furthermore, in the illustrative embodiment, the fluid-pressure generating means include master cylinder MC. Alternatively, the fluid-pressure generating means may include a pump or a pressure-accumulator source.

The entire contents of Japanese Patent Application P2001-384516 filed Dec. 18, 2001 are hereby incorporated by reference.

What is claimed is:

1. A brake control system for a motor vehicle with a master cylinder, a first wheel cylinder, and a second wheel cylinder, the brake control system comprising:
   a brake line with a supply line;
   a pump that supplies brake fluid to the supply line;
   branch lines branched from the supply line to the first and second wheel cylinders;
   a pressure controller that allows independent control of brake-fluid pressures within the first and second wheel cylinders; and
   an ECU that controls the pump and the pressure controller, the ECU comprising an estimate part that estimates the pressures within the first and second wheel cylinders in accordance with a flow amount of brake fluid obtained out of signals indicative of braking conditions, the estimate part being so programmed as to:
      estimate an amount of brake fluid flowing from the supply line to the first wheel cylinder, wherein the first wheel cylinder has a pressure that is lower than a pressure in the supply line, wherein the amount of brake fluid flowing from the supply line to the first wheel cylinder is estimated based on a difference between the pressure within the first wheel cylinder and the pressure in the supply line when the control to the first wheel cylinder is switched to pressure-increase control; and
      estimate an actual pressure within the first wheel cylinder based on the estimated amount of brake fluid.

2. The brake control system as claimed in claim 1, wherein the brake line comprises a line connecting the master cylinder to the first and second wheel cylinders.

3. The brake control system as claimed in claim 2, wherein the line of the brake line comprises two systems, the systems being connected to the first and second wheel cylinders, respectively.

4. The brake control system as claimed in claim 1, wherein the pressure controller comprises an OUT-side gate valve arranged in the brake line upstream of the branch lines, inlet valves arranged in the branch lines for closing and opening thereof, a drain circuit for discharging brake fluid from the first and second wheel cylinders to the master cylinder, outlet valves arranged in the drain circuit for closing and opening thereof, a suction circuit for supplying brake fluid from the master cylinder to the pump, and an IN-side gate valve arranged in the suction circuit for closing and opening thereof.

5. The brake control system as claimed in claim 4, wherein the ECU carries out brake-fluid pressure control when increasing the pressure within the first wheel cylinder, wherein the IN-side gate valve is opened, and the pump is driven to supply brake fluid to the supply line so as to control opening of the OUT-side gate valve, thereby adjusting the amount of brake fluid discharged from the supply line to the master cylinder to adjust the pressure in the supply line, and wherein with the inlet valve of the second wheel cylinder closed, opening of the inlet valve of the first wheel cylinder is controlled to supply brake fluid from the supply line to the first wheel cylinder, thereby controlling the pressure within the first wheel cylinder.

6. The brake control system as claimed in claim 1, wherein the estimate part comprises a compute part for computing the pressure in the supply line and an estimate part for estimating the pressure within the first wheel cylinder.

7. The brake control system as claimed in claim 6, wherein the compute part computes the supply-line pressure in accordance with a discharge amount of the pump, an amount of brake fluid passing through an OUT-side gate valve, and the amount of brake fluid as estimated.

8. The brake control system as claimed in claim 7, wherein the wheel-cylinder pressure estimate part estimates the actual pressure within the first wheel cylinder in accordance with an amount of brake fluid passing through the inlet valve obtained based on the supply-line pressure as computed, a previous pressure within the first wheel cylinder, and an open time of the inlet valve, an amount of brake fluid passing through the outlet valve obtained based on the previous pressure within the first wheel cylinder and an open time of the outlet valve.

9. A motor vehicle, comprising:
a master cylinder;
first and second wheel cylinders connected to the master cylinder; and
a brake control system, comprising:
a brake line with a supply line;
a pump that supplies brake fluid to the supply line;
branch lines branched from the supply line to the first and second wheel cylinders;
a pressure controller that allows independent control of brake-fluid pressures within the first and second wheel cylinders; and
an ECU that controls the pump and the pressure control, the ECU comprising an estimate part that estimates the pressures within the first and second wheel cylinders in accordance with a flow amount of brake fluid obtained out of signals indicative of braking conditions, the estimate part being so programmed as to:
estimate an amount of brake fluid flowing from the supply line to the first wheel cylinder, wherein the first wheel cylinder has a pressure that is lower than a pressure in the supply line, wherein the amount of brake fluid flowing from the supply line to the first wheel cylinder is estimated based on a difference between the pressure within the first wheel cylinder and the pressure in the supply line when the control to the first wheel cylinder is switched to pressure-increase control; and
estimate an actual pressure within the first wheel cylinder based on the estimated amount of brake fluid.

10. The motor vehicle as claimed in claim 9, wherein the brake line comprises a line connecting the master cylinder to the first and second wheel cylinders.

11. The motor vehicle as claimed in claim 10, wherein the line of the brake line comprises two systems, the systems being connected to the first and second wheel cylinders, respectively.

12. The motor vehicle as claimed in claim 9, wherein the pressure controller comprises an OUT-side gate valve arranged in the brake line upstream of the branch lines, inlet valves arranged in the branch lines for closing and opening thereof, a drain circuit for discharging brake fluid from the first and second wheel cylinders to the master cylinder, outlet valves arranged in the drain circuit for closing and opening thereof, a suction circuit for supplying brake fluid from the master cylinder to the pump, and an IN-side gate valve arranged in the suction circuit for closing and opening thereof.

13. The motor vehicle as claimed in claim 12, wherein the ECU carries out brake-fluid pressure control when increasing the pressure within the first wheel cylinder, wherein the IN-side gate valve is opened, and the pump is driven to supply brake fluid to the supply line so as to control opening of the OUT-side gate valve, thereby adjusting the amount of brake fluid discharged from the supply line to the master cylinder to adjust the pressure in the supply line, and wherein with the inlet valve of the second wheel cylinder closed, opening of the inlet valve of the first wheel cylinder is controlled to supply brake fluid from the supply line to the first wheel cylinder, thereby controlling the pressure within the first wheel cylinder.

14. The motor vehicle as claimed in claim 9, wherein the estimate part comprises a compute part for computing the pressure in the supply line and an estimate part for estimating the pressure within the first wheel cylinder.

15. The motor vehicle as claimed in claim 14, wherein the compute part computes the supply-line pressure in accordance with a discharge amount of the pump, an amount of brake fluid passing through an OUT-side gate valve, and the amount of brake fluid as estimated.

16. The motor vehicle as claimed in claim 15, wherein the wheel-cylinder pressure estimate part estimates the actual pressure within the first wheel cylinder in accordance with an amount of brake fluid passing through the inlet valve obtained based on the supply-line pressure as computed, a previous pressure within the first wheel cylinder, and an open time of the inlet valve, an amount of brake fluid passing through the outlet valve obtained based on the previous pressure within the first wheel cylinder and an open time of the outlet valve.

17. A method of controlling a braking device for a motor vehicle having a master cylinder, a first wheel cylinder, and a second wheel cylinder, the braking device comprising:
a brake line with a supply line;
a pump that supplies brake fluid to the supply line;
branch lines branched from the supply line to the first and second wheel cylinders; and
a pressure controller that allows independent control of brake-fluid pressures within the first and second wheel cylinders, the method comprising:
estimating pressures within the first and second wheel cylinders in accordance with a flow amount of brake fluid obtained out of signals indicative of braking conditions;
estimating an amount of brake fluid flowing from the supply line to the first wheel cylinder, wherein the first wheel cylinder has a pressure that is lower than a pressure in the supply line, wherein the amount of brake fluid flowing from the supply line to the first wheel cylinder is estimated based on a difference between the pressure in the first wheel cylinder and the pressure in the supply line when the control to the first wheel cylinder is switched to pressure-increase control; and
estimating an actual pressure within the first wheel cylinder based on the estimated amount of brake fluid.

* * * * *